(12) United States Patent
Higashi

(10) Patent No.: US 11,245,296 B2
(45) Date of Patent: Feb. 8, 2022

(54) ROTOR OF PERMANENT MAGNET SURFACE AFFIXATION-TYPE ROTATING MACHINE AND METHOD FOR MANUFACTURING SAME

(71) Applicant: MEIDENSHA CORPORATION, Tokyo (JP)

(72) Inventor: Yoshitaka Higashi, Chuo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/274,505

(22) PCT Filed: Jun. 26, 2019

(86) PCT No.: PCT/JP2019/025267
§ 371 (c)(1),
(2) Date: Mar. 9, 2021

(87) PCT Pub. No.: WO2020/054177
PCT Pub. Date: Mar. 19, 2020

(65) Prior Publication Data
US 2021/0249917 A1  Aug. 12, 2021

(30) Foreign Application Priority Data
Sep. 10, 2018 (JP) .............................. JP2018-168722

(51) Int. Cl.
*H02K 1/27* (2006.01)
*H02K 1/30* (2006.01)
*H02K 15/03* (2006.01)

(52) U.S. Cl.
CPC ............... *H02K 1/278* (2013.01); *H02K 1/30* (2013.01); *H02K 15/03* (2013.01)

(58) Field of Classification Search
CPC ................................. H02K 1/30; H02K 15/03
(Continued)

(56) References Cited

U.S. PATENT DOCUMENTS

| 4,748,359 A * | 5/1988 | Yahara ................... H02K 1/278 |
| | | 310/156.13 |
| 2003/0117032 A1* | 6/2003 | Komuro ................. H02K 15/03 |
| | | 310/156.08 |

(Continued)

FOREIGN PATENT DOCUMENTS

| JP | 9-9539 A | 1/1997 |
| JP | 2004-120916 A | 4/2004 |

(Continued)

*Primary Examiner* — Jose A Gonzalez Quinones
(74) *Attorney, Agent, or Firm* — Foley & Lardner LLP

(57) ABSTRACT

Provided are rotor of permanent magnet surface affixation-type rotating machine and its manufacturing method, where permanent magnets previously magnetized are easily fixable at proper positions while restricting cost. In rotor of permanent magnet surface affixation-type rotating machine, including cylindrical rotor shaft 11, columnar guides 13 extending along axial direction of rotor shaft 11 and disposed in circumferential direction at regular intervals, and permanent magnets 12 previously magnetized and installed on surface of rotor shaft 11 and between the adjacent guides 13, axial length of guide 13 is formed longer than that of region where permanent magnets 12 are installed, guide 13 is disposed on surface of rotor shaft 11 such that guide 13 projects toward both sides in axial direction from region where permanent magnets 12 are installed, and projection portions 13a, 13b projecting in axial direction from region where permanent magnets 12 are installed are fixed to rotor shaft 11.

5 Claims, 6 Drawing Sheets

(58) Field of Classification Search
USPC ............ 310/156.08, 156.11, 156.19, 156.21, 310/156.09
See application file for complete search history.

(56) References Cited

U.S. PATENT DOCUMENTS

| | | | |
|---|---|---|---|
| 2004/0258526 A1 | 12/2004 | Brahmavar et al. | |
| 2009/0102304 A1* | 4/2009 | Yamamura | H02K 1/278 310/156.28 |
| 2016/0065011 A1* | 3/2016 | Schneider | H02K 15/03 310/216.007 |

FOREIGN PATENT DOCUMENTS

| | | | |
|---|---|---|---|
| JP | 2004-297892 A | | 10/2004 |
| JP | 2004297892 A | * | 10/2004 |
| JP | 2007-37288 A | | 2/2007 |
| JP | 2010172095 A | * | 8/2010 |
| JP | 2013-183537 A | | 9/2013 |
| JP | 6370521 B1 | | 8/2018 |
| WO | WO 2016/143008 A1 | | 9/2016 |

\* cited by examiner

ROTOR OF PERMANENT MAGNET SURFACE AFFIXATION-TYPE ROTATING MACHINE AND METHOD FOR MANUFACTURING SAME

TECHNICAL FIELD

The present invention relates to a rotor of a permanent magnet surface affixation-type rotating machine and a method for manufacturing the same.

BACKGROUND ART

Hitherto, there has been known a method (magnet single body magnetization method) of affixing a magnet produced by magnetizing a magnet material as a single body to a rotor shaft.

In this way, in case that a magnet produced by magnetizing a magnet material as a single body is adhered to a rotor shaft, in order to prevent a magnet and another magnet adjacently positioned in the circumferential direction from attracting each other and moving, as shown in FIG. 8, a rotor shaft 101 is formed on its surface with magnet fixing grooves 101a in the circumferential direction at regular intervals, and magnets 102 are inserted into and fixed in the grooves 101a. The grooves 101a are provided by directly machining the rotor shaft 101 or by attaching a silicon steel sheet core formed with grooves to the rotor shaft 101.

Furthermore, in order to prevent adjacent magnets from attracting each other by attractive force of the magnets and deviating from their positions in the circumferential direction, it is known that guides extending in the axial direction are attached in the circumferential direction at regular intervals (see, for example, the following Patent Publication 1).

PRIOR ART PUBLICATIONS

Patent Publications

Patent Publication 1: JP Patent Application Publication 2007-37288

SUMMARY OF THE INVENTION

Task to be Solved by the Invention

However, as mentioned above, in a method of directly machining the rotor shaft to form magnet fixing grooves or of attaching a silicon steel sheet core formed with grooves to the rotor shaft, there has been a problem of the increase in machining workload and cost.

Furthermore, in the case of determining the magnet positions in the circumferential direction by using guides, a method of fixing the guides onto the rotor shaft by screws is adopted. However, in case that the guide has a small width in the circumferential direction (in case that the distance between magnets adjacently disposed in the circumferential direction is narrow), there also has been a problem in which low-price, ready-made screws cannot be adopted, but special screws become necessary to increase the cost.

In view of this, it is an object of the present invention to provide a rotor of a permanent magnet surface affixation-type rotating machine and a method for manufacturing the same, in which permanent magnets magnetized in advance can be easily fixed at proper positions while restricting the cost.

Means for Solving the Task

A rotor of a permanent magnet surface affixation-type rotating machine according to a first invention for solving the above task, comprises:
 a cylindrical rotor shaft;
 a plurality of columnar guides that extend along an axial direction of the rotor shaft and are disposed in a circumferential direction thereof at regular intervals; and
 permanent magnets each of which is magnetized in advance and is installed on a surface of the rotor shaft and between the adjacent guides,
 wherein an axial length of the guide is longer than an axial length of a region in which the permanent magnets are installed, the guide is disposed on the surface of the rotor shaft such that the guide projects toward both sides in the axial direction from the region in which the permanent magnets are installed, and projection portions of the guide projecting in the axial direction from the region in which the permanent magnets are installed are fixed to the rotor shaft by a fixing means.

In the first invention, the rotor of the permanent magnet surface affixation-type rotating machine according to a second invention for solving the above task is that the fixing means is annularly formed and comprises two ring jigs, each having a plurality of guide fixing grooves in the circumferential direction at regular intervals, for fixing the projection portions.

In the first or second invention, the rotor of the permanent magnet surface affixation-type rotating machine according to a third invention for solving the above task is that the permanent magnets have magnet side surfaces that are planes positioned on both sides in the circumferential direction and parallel with each other, and
 that the guide is formed into a rectangular parallelepiped shape.

In any one of the first to third inventions, the rotor of the permanent magnet surface affixation-type rotating machine according to a fourth invention for solving the above task is that the guide is made of resin, and
 that the rotor shaft has a plurality of guide inserting grooves which are formed along the axial direction on the surface of the rotor shaft and into which the guides are insertable.

In a method for producing a rotor of a permanent magnet surface affixation-type rotating machine according to a fifth invention for solving the above task, the rotor comprises:
 a cylindrical rotor shaft;
 a plurality of columnar guides that extend along an axial direction of the rotor shaft and are disposed in a circumferential direction thereof at regular intervals; and
 permanent magnets each of which is magnetized in advance and is installed on a surface of the rotor shaft and between the adjacent guides,
 wherein the guide formed to be longer than axial length of a region in which the permanent magnets are installed is disposed to project toward both sides in the axial direction from the region in which the permanent magnets are installed,
 wherein projection portions of the guide projecting in the axial direction from the region in which the permanent magnets are installed are fixed to the rotor shaft, and the permanent magnet is fixed between the guides adjacent in the circumferential direction.

In the fifth invention, the method for producing the rotor of the permanent magnet surface affixation-type rotating machine according to a sixth invention for solving the above task is that the projection portions are fixed to the rotor shaft by two ring jigs each having a plurality of guide fixing grooves in the circumferential direction at regular intervals, and that the ring jigs are removed after fixing the permanent magnet between the guides adjacent in the circumferential direction.

In the fifth or sixth invention, the method for producing the rotor of the permanent magnet surface affixation-type rotating machine according to a seventh invention for solving the above task is that the permanent magnets have magnet side surfaces that are planes positioned on both sides in the circumferential direction and parallel with each other, and that the guide is formed into a rectangular parallelepiped shape.

In any one of the fifth to seventh inventions, the method for producing the rotor of the permanent magnet surface affixation-type rotating machine according to an eighth invention for solving the above task is that the rotor shaft has a plurality of guide inserting grooves which are formed along the axial direction on the surface of the rotor shaft, and that the guide is made of resin, and the projection portions are fixed to the rotor shaft in a condition that the guide is inserted into the guide insertion groove.

Advantageous Effect of the Invention

By a rotor of a permanent magnet surface affixation-type rotating machine and a method for manufacturing the same according to the present invention, it is possible to easily fix permanent magnets magnetized in advance at proper positions while restricting the cost.

MODE FOR IMPLEMENTING THE INVENTION

In the following, using the drawings, a rotor of a permanent magnet surface affixation-type rotating machine and a method for manufacturing the same according to the first embodiment of the present invention will be explained.

First Embodiment

Using FIG. 1 and FIG. 2, a rotor of a permanent magnet surface affixation-type rotating machine and a method for manufacturing the same according to the first embodiment of the present invention will be explained in detail.

Figure 1:
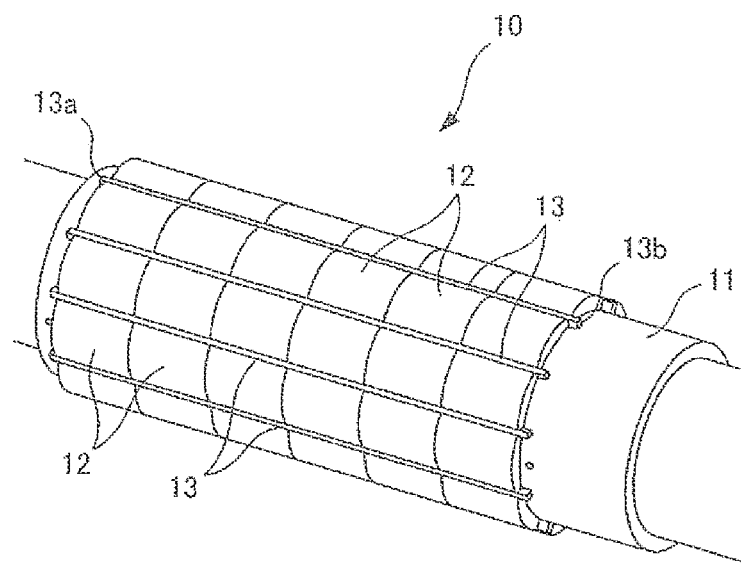
FIG. 1 is a perspective view showing a rotor of a permanent magnet surface affixation-type rotating machine according to the first embodiment of the present invention.
Figure 2:
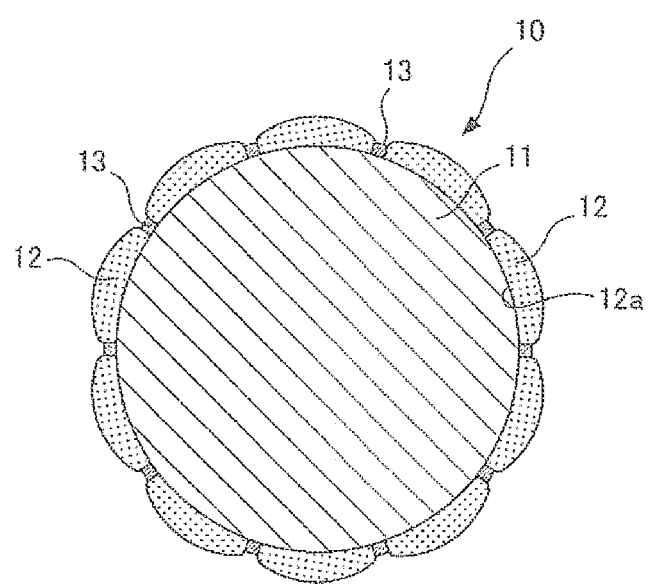
FIG. 2 is a longitudinal sectional view of FIG. 1.

As shown in FIG. 1 and FIG. 2, a rotor 10 of the present embodiment is configured by including a cylindrical rotor shaft 11, a plurality of generally plate-shape permanent magnets 12 that are fixed to the surface of the rotor shaft 11, and a plurality of columnar guides 13 for determining the positions of the permanent magnets 12.

The magnet is magnetized in advance, and its bottom surface 12a to be fixed to the rotor shaft 11 has an arcuate shape along the shape of the rotor shaft 11.

The guide 13 is set such that its length in the longitudinal direction (axial direction) becomes longer than the axial length of a region in which the permanent magnets are installed and which is determined depending on the number of the permanent magnets 12 to be disposed in the axial direction (in the following, magnet disposition number, six in the present embodiment) and that both end portions of the guide 13 project from the permanent magnets 12 in the axial direction (in the following, portions of the guide 13 projecting from the permanent magnets 12 in the axial direction will be referred to as projection portions 13a, 13b).

In the present embodiment, the guides 13 by the number of ten are disposed on the surface of the rotor shaft 11 in the circumferential direction at regular intervals to respectively extend in time axial direction. The projection portions 13a, 13b are fixed to the rotor shaft 11 by a fixing means.

Then, between guides 13, 13 adjacent in the circumferential direction, a plurality (six in the present embodiment) of the above-mentioned permanent magnets 12 magnetized in advance are placed in the axial direction with no space therebetween, and the permanent magnets 12 are fixed to the rotor shaft 11 by adhesive, thereby producing a rotor of a permanent magnet surface affixation-type rotating machine.

The fixing means may be screwing, adhesion, welding or a method using jig, as long as the projection portions 13a, 13b can be fixed to the surface of the rotor shaft 11.

According to a rotor of a permanent magnet surface affixation type rotating machine and a method for manufacturing the same according to the present embodiment configured in this way, it is possible to prevent the positional deviation of the permanent magnets 12, which are to be fixed to the rotor shaft 11 by using the guides 13. Therefore, it becomes possible to omit the formation of grooves for the permanent magnets 12 in the rotor shaft 11 to restrict the cost. Furthermore, the guide 13 is formed with the projection portions 13a, 13b, and it is configured that the projection portions 13a, 13b can be fixed. Therefore, for example, even in the case of fixing the projection portions 13a, 13b of the guide 13 by screwing, it is not necessary to use special screws, thereby restricting the cost.

Second Embodiment

Using FIG. 3 to FIG. 5, a rotor of a permanent magnet surface affixation-type rotating machine and a method for manufacturing the same according to the second embodiment of the present invention will be explained in detail.

The present embodiment is different from the above-mentioned first embodiment in terms of means for fixing the guides 13 to the rotor shaft 11. The other constructions are similar to the first embodiment. Therefore, the same members are designated by the same signs, and the repetitive explanations are omitted.

Figure 3:
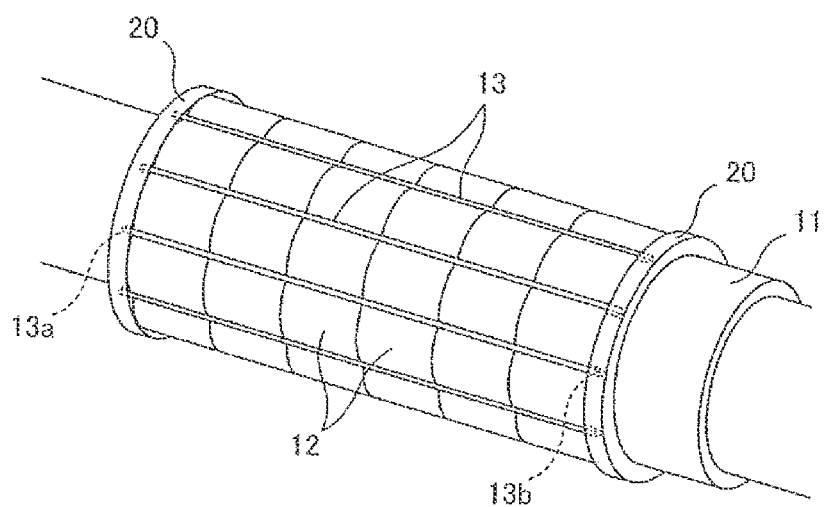
FIG. 3 is a perspective view showing a rotor of a permanent magnet surface affixation-type rotating machine according to the second embodiment of the present invention.
Figure 4:
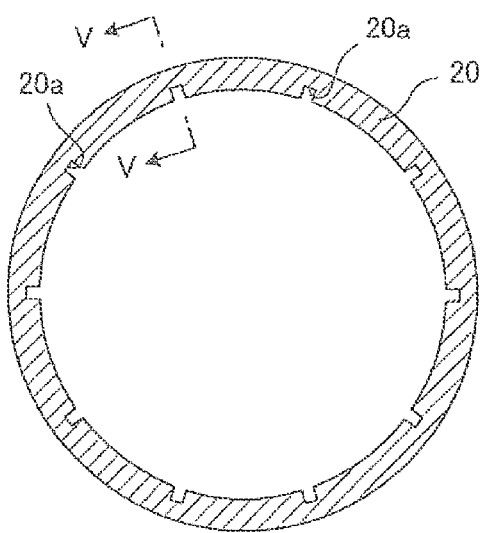
FIG. 4 is a sectional view showing a ring jig shown in FIG. 3.
Figure 5:
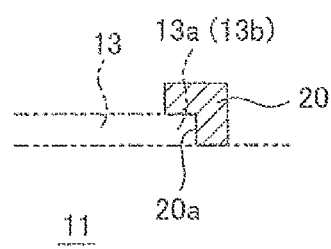
FIG. 5 is a sectional view taken along lines V-V of the ring jig shown in FIG. 4.

As shown in FIG. 3 to FIG. 5, in the present embodiment, as a means for fixing the projection portions 13a, 13b of the guide 13 to the rotor shaft 11, ring jigs 20 are used. The ring jig 20 is annularly formed and is equipped on its inner peripheral side with guide fixing grooves 20a for fixing the projection portions 13a, 13b of the guide 13. The axial length of the guide fixing grooves 20a is shorter than the axial length of the ring jig 20.

In the present embodiment, each of the projection portions 13a, 13b of the guide 13 is inserted into the guide fixing groove 20a of the ring jig 20, and the ring jigs 20 are fixed to the rotor shaft 11 by screwing under a condition that the axial distance between the two ring jigs 20 is adjusted to a distance capable of securing a space to stick the permanent magnets 12. Furthermore, the guides 13 are fixed to the rotor shaft 11 by adhesive.

Then, between the guides 13 adjacent in the circumferential direction, a plurality (six in the present embodiment) of the permanent magnets 12 magnetized in advance are placed in the axial direction with no space therebetween, and the permanent magnets 12 are fixed to the rotor shaft 11 by adhesive, thereby producing a rotor of a permanent magnet surface affixation-type rotating machine. The ring jigs 20 are removed, after the permanent magnets 12 have been sufficiently fixed to the rotor shaft 11.

FIG. 5 shows an example that the ring jig 20 is monolithically formed. However, the ring jig 20 may be formed by combining separate members, such as stacking together a ring member with the guide fixing grooves passing therethrough in the axial direction and a ring member with no grooves.

According to a rotor of a permanent magnet surface affixation-type rotating machine and a method for manufacturing the same according to the present embodiment configured in this way, in addition to the advantageous effects of the first embodiment, it is possible to easily fix the guides 13 to the surface of the rotor shaft 11. With this, it is possible to shorten the period of time for fixing the guides 13 and prevent the axial displacement of the permanent magnets 12 that are placed by a plural number in the axial direction.

Third Embodiment

Using FIG. 6, a rotor of a permanent magnet surface affixation-type rotating machine and a method for manufacturing the same according to the third embodiment of the present invention will be explained in detail.

Figure 6:
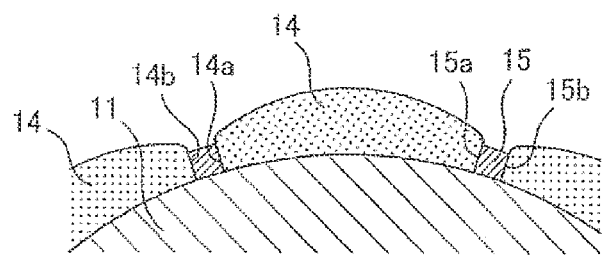
FIG. 6 is a main part sectional view showing a rotor of a permanent magnet surface affixation-type rotating machine according to the third embodiment of the present invention.

In the present embodiment, permanent magnets 14 and guides 15 shown in FIG. 6 are used, in place of the permanent magnets 12 and the guides 13 of the above-mentioned first embodiment. The other constructions are similar to the first embodiment. Therefore, the same members are designated by the same signs, and the repetitive explanations are omitted.

As shown in FIG. 6, in the present embodiment, the shape of the permanent magnet 14 is set such that a magnet side surface 14a on one side in the circumferential direction becomes parallel with a magnet side surface 14b on the other side in the circumferential direction of another permanent magnet 14 adjacent in the circumferential direction. Along this, the guide 15 is formed into a rectangular parallelepiped shape in which its end surfaces (guide side surfaces) in the circumferential direction become parallel with each other.

The guides 15 formed in this way are disposed on the surface of the rotor shaft 11 in the circumferential direction at regular intervals to respectively extend in the axial direction, and the projection portions (not shown in the drawings) are fixed to the rotor shaft 11 by a fixing means such as screwing, adhesion, welding or jig.

Then, between the guides 15 adjacent in the circumferential direction, the permanent magnets 14 magnetized in advance are placed by a plural number in the axial direction with no space therebetween, and the permanent magnets 14 are fixed to the rotor shaft 11 by adhesive, thereby producing a rotor of a permanent magnet surface affixation-type rotating machine.

According to a rotor of a permanent magnet surface affixation-type rotating machine and a method for manufacturing the same according to the present embodiment configured in this way, in addition to the advantageous effects of the first embodiment, it is possible to adopt low-price, rectangular parallelepiped guides as the guides 15, thereby reducing the cost.

The present embodiment shows an example in which the permanent magnets 14 and the guides 15 shown in FIG. 6 are used, in place of the permanent magnets 12 and the guides 13 of the above-mentioned first embodiment. It is, however, needless to say that the permanent magnets 14 and the guides 15 shown in FIG. 6 may be adopted, in place of the permanent magnets 12 and the guides 13 of the above-mentioned second embodiment.

Fourth Embodiment

Using FIG. 7, a rotor of a permanent magnet surface affixation-type rotating machine and a method for manufacturing the same according to the fourth embodiment of the present invention will be explained in detail.

Figure 7:
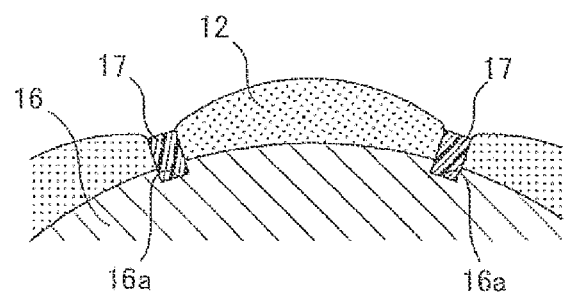
FIG. 7 is a main part sectional view showing a rotor of a permanent magnet surface affixation-type rotating machine according to the fourth embodiment of the present invention.
Figure 8:
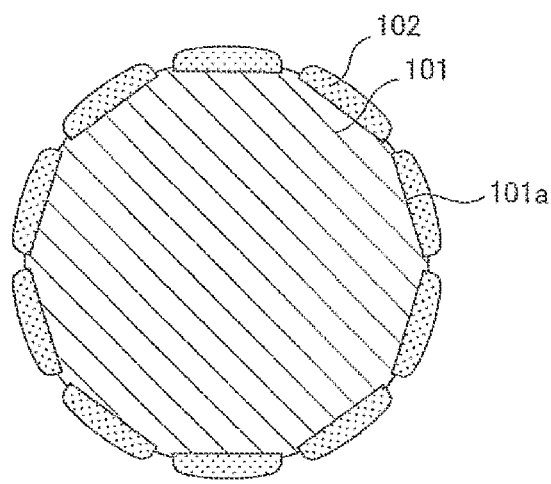
FIG. 8 is a sectional view showing a rotor of a conventional permanent magnet surface affixation-type rotating machine.

In the present embodiment, a rotor shaft 16 and guides 17 shown in FIG. 7 are used, in place of the rotor shaft 11 and the guides 13 explained in the above-mentioned first embodiment. The other constructions are similar to the first embodiment. Therefore, the same members are designated by the same signs, and the repetitive explanations are omitted.

As shown in FIG. 7, in the present embodiment, the rotor shaft 16 is formed with guide inserting grooves 16a for inserting the guides 17. The guide inserting grooves 16a are formed in the circumferential direction at regular intervals to extend in the axial direction.

The guide 17 is made of resin, and its projection portions (not shown in the drawings) on both sides in the axial direction are fixed to the rotor shaft 16 by a fixing means such as screwing, adhesion, welding, or jig under a condition that it is inserted into the guide inserting groove 16a.

Then, between guides 17, 17 adjacent in the circumferential direction, a plurality of the permanent magnets 12 magnetized in advance are placed in the axial direction with no space therebetween, and the permanent magnets 12 are fixed to the rotor shaft 16 by adhesive, thereby producing a rotor of a permanent magnet surface affixation-type rotating machine.

According to a rotor of a permanent magnet surface affixation-type rotating machine and a method for manufacturing the same according to the present embodiment configured in this way, even if the guide 17 is made of resin, it is possible to prevent the guide 17 from warping in the circumferential direction by attractive force or repulsive force of the permanent magnets 12. Furthermore, as compared with the case of forming grooves for the permanent magnets 12 in the rotor shaft 11, the guide inserting groove 16a for inserting the guide 17 becomes smaller in terms of width in the circumferential direction and depth in the radial direction. Therefore, the machining labor time can be reduced to restrict the machining expense. In the case of adopting the guides 17 made of resin, it is also possible to obtain advantages that eddy-current loss does not occur, and resistance against centrifugal force is high due to its light weight, as compared with the metal guides.

The present embodiment shows an example in which the rotor shaft 16 and the guides 17 shown in FIG. 7 are used, in place of the rotor shaft 11 and the guides 13 explained in the first embodiment. It is, however, needless to say that the rotor shaft 16 and the guides 17 shown in FIG. 7 may be adopted, in place of the rotor shaft 11 and the guides 13 of the above-mentioned second embodiment or the rotor shaft 11 and the guides 15 of the above-mentioned third embodiment.

EXPLANATION OF SIGNS

10: rotor;
11, 16: rotor shaft;
12, 14: permanent magnet;
12a: bottom surface;
10, 16, 17: guide
13a, 13b: projection portion
14a, 14b: magnet side surface;
15a, 15b: guide side surface;
16a: guide inserting groove
20: ring jig
20a: guide fixing groove

The invention claimed is:

1. A method for producing a rotor of a permanent magnet surface affixation-type rotating machine, the rotor comprising:
 a cylindrical rotor shaft;
 a plurality of columnar guides that extend along an axial direction of the rotor shaft and are disposed in a circumferential direction thereof at regular intervals; and
 permanent magnets each of which is magnetized in advance and is installed on a surface of the rotor shaft and between adjacent guides,
 wherein a guide formed to be longer than an axial length of a region in which the permanent magnets are installed is disposed to project toward both sides in the axial direction from the region in which the permanent magnets are installed,
 wherein projection portions of the guide projecting in the axial direction from the region in which the permanent magnets are installed are fixed to the rotor shaft by two ring jigs each being annularly formed and each having a plurality of guide fixing grooves in the circumferential direction at regular intervals, and
 wherein a permanent magnet is fixed between guides adjacent in the circumferential direction, and then each of the two ring jigs is removed.

2. The method for producing the rotor of the permanent magnet surface affixation-type rotating machine as claimed in claim 1, wherein the permanent magnets have magnet side surfaces that are planes positioned on both sides in the circumferential direction and parallel with each other, and
 wherein the guide is formed into a rectangular parallelepiped shape.

3. The method for producing the rotor of the permanent magnet surface affixation-type rotating machine as claimed in claim 1, wherein the rotor shaft has a plurality of guide inserting grooves which are formed along the axial direction on the surface of the rotor shaft, and
 wherein the guide is made of resin, and the projection portions are fixed to the rotor shaft in a condition that the guide is inserted into a guide inserting groove.

4. The method for producing the rotor of the permanent magnet surface affixation-type rotating machine as claimed in claim 1, wherein each ring jig is fixed to the rotor shaft in a condition where the projection portions of each guide are inserted into the guide fixing grooves of the two ring jigs and where the two ring jigs are spaced away from each other in the axial direction of the rotor shaft to provide therebetween the region in which the permanent magnets are installed, and each guide is fixed to the rotor shaft by adhesive,
 wherein the permanent magnet between the guides adjacent in the circumferential direction is fixed to the rotor shaft by adhesive, and then each ring jig is removed from the rotor shaft.

5. The method for producing the rotor of the permanent magnet surface affixation-type rotating machine as claimed in claim 4, wherein a ring jig is equipped on an inner peripheral side thereof with the guide fixing grooves, each guide fixing groove having an axial length that is shorter than an axial length of the ring jig.

* * * * *